US012548640B2

(12) United States Patent
Mesquita De Carvalho et al.

(10) Patent No.: US 12,548,640 B2
(45) Date of Patent: Feb. 10, 2026

(54) PORTABLE ANALYSIS SYSTEM

(71) Applicants: Petróleo Brasileiro S.A.-Petrobras, Rio de Janeiro (BR); Universidade Federal Do Rio De Janeiro-UFRJ, Rio de Janeiro (BR)

(72) Inventors: Rogerio Mesquita De Carvalho, Rio de Janeiro (BR); Rosane Alves Fontes, Rio de Janeiro (BR); Helida Vasques Peixoto Vieira, Rio de Janeiro (BR); Raphael Dos Santos Evangelista, Rio de Janeiro (BR); Maria Luisa Aleixo Gonçalves, Rio de Janeiro (BR); Rafaella Magliano Balbi De Faria, Rio de Janeiro (BR); Helena Cristina Da Gama Leitão, Rio de Janeiro (BR); Leandro Augusto Frata Fernandes, Rio de Janeiro (BR); Stefan Suarez Ferreira, Rio de Janeiro (BR); Aline Machado De Azevedo Novaes, Rio de Janeiro (BR); Marco Antônio Gomes Teixeira, Rio de Janeiro (BR); Igor Domingos Rodrigues, Rio de Janeiro (BR); Gustavo Lelis Da Silva, Rio de Janeiro (BR); Caroline Dos Santos Silva, Rio de Janeiro (BR)

(73) Assignees: Petróleo Brasileiro S.A.—Petrobras, Rio de Janeiro (BR); Universidade Federal Do Rio De Janeiro—UFRJ, Rio de Janeiro (BR)

( * ) Notice: Subject to any disclaimer, the term of this patent is extended or adjusted under 35 U.S.C. 154(b) by 483 days.

(21) Appl. No.: 17/991,960

(22) Filed: Nov. 22, 2022

(65) Prior Publication Data

US 2023/0170060 A1 Jun. 1, 2023

(30) Foreign Application Priority Data

Nov. 26, 2021 (BR) ..................... 10 2021 023976 0

(51) Int. Cl.
*G16C 20/70* (2019.01)
*G06N 5/04* (2023.01)
*G07C 3/08* (2006.01)

(52) U.S. Cl.
CPC ............... *G16C 20/70* (2019.02); *G06N 5/04* (2013.01); *G07C 3/08* (2013.01)

(58) Field of Classification Search
None
See application file for complete search history.

(56) References Cited

U.S. PATENT DOCUMENTS

2006/0073484 A1* 4/2006 Mathies ............... C12Q 1/6806
435/6.19

FOREIGN PATENT DOCUMENTS

BR 1120200074918 A2 10/2020
BR 1120210001115 A2 4/2021

OTHER PUBLICATIONS

Garcia et al. (2011) "Mobile Phone Platform as Portable Chemical Analyzer", Sensors and Actuators B:Chemical, 156:350-359.

* cited by examiner

*Primary Examiner* — Walter L Lindsay, Jr.
*Assistant Examiner* — Geoffrey T Evans
(74) *Attorney, Agent, or Firm* — Morrison & Foerster LLP

(57) ABSTRACT

The present invention refers to a portable analysis system that, from analytical methodologies set based on digital images acquired by portable devices and accessories developed in an expedited way, allows the performance of the analytical test without technical deepening by the executor of the analysis. Such methodologies allow the evaluation of chemical species relevant to the O&G sector, for following up compositional parameters in aqueous samples and analytical monitoring of production and effluent treatment.

(Continued)

Thus, a quick implementation is possible considering eventual diagnoses associated with the parameters of interest and following up of different processes. The application can be in any laboratory present in an operational unit, whether offshore or onshore, as well as it can be used for direct measurement in the field, depending on the necessary environmental and operating conditions.

11 Claims, 3 Drawing Sheets

PORTABLE ANALYSIS SYSTEM

CROSS-REFERENCE TO RELATED APPLICATION

This application claims priority to Brazilian Application No. 10 2021 023976 0, filed on Nov. 26, 2021, and entitled "PORTABLE ANALYSIS SYSTEM," the disclosure of which is incorporated herein by reference in its entirety.

FIELD OF INVENTION

The present invention refers to a portable analysis system based on digital image for measuring various parameters of the fluid with application in offshore (as well as onshore) production units aiming to follow up compositional parameters of interest and analytical monitoring of production and effluent treatment so that action strategies can be established in order to avoid unscheduled production stops.

DESCRIPTION OF THE STATE OF THE ART

A production unit in the offshore (and also onshore) oil industry is a complex enterprise that contemplates, analytical methodologies for monitoring production in the laboratories on board. However, in a production unit, there is a tendency to keep on board the essential analytical methodologies for the characteristics of that specific production. It is not uncommon the emergence of sudden analytical follow-up needs, without the possibility of rapid implementation in the laboratory units on board. If such a situation occurs, the need to monitor a given analytical parameter is established so that those responsible can make their decisions. The analysis results become essential.

However, due to resource presence optimization on board, very often this is not a possible solution with the structure available in the production facility. In addition, it is often necessary to ship skilled labor for that specific methodology, which is also a complicating aspect. Even if these difficulties are superimposed, it remains the fact that analytical equipment requires that investments be acquired and will certainly not be idly waiting to be shipped due to an absolutely unexpected situation. Currently, many offshore platforms present problems of carbonate and sulphate fouling. As the composition analysis of these fluids is carried out on land, the result takes a significant amount of time and makes it impossible to make a quick decision to prevent the problem.

An alternative that is sometimes practiced is the landing of samples for analysis in structured laboratories. In these cases, there are often logistical difficulties, lack of adequate sampling and preservation conditions for the concentration determination of a given analyte to be carried out safely, in addition to the need for transport by sea (certain conditions prevent air transport of samples). In some cases, valuable time is lost, which can even stop production depending on the type of occurrence. There are also situations in which a certain parameter needs to be measured in the offshore laboratory for some period of time (or even indefinitely). In these cases, in addition to unloading samples, an alternative is the implementation of a reference method on board, when possible. Nonetheless in general, the analysis time, the method cost, and the laboratory space are limitations that make any possible alternative unfeasible.

Document BR1120200074918A2 describes a method for evaluating the suitability of a mobile device to perform an analytical measurement based on color formation chemical reactions, the mobile device having at least one camera. This color formation is typified by comparing with a reference region unaffected by the intended reaction. However, such image patterns are not recognized by artificial intelligence techniques, separated and correlated with analytical information by a treatment by completely different neural networks that provide the data correlation separated from images with analytical data and that may come from chemical reactions, but can also be pre-existing in the sample, or even they can be induced by other processes, and they can include color, but they can also include texture, turbidity, opacity, abundance and properties of formed or converted solids, and many other pre-existing characteristics in the samples or worked on documentable modifications by digital images induced in the samples, modifications obtained by physical, physical-chemical or chemical processes.

Document BR1120210001115A2 discloses a method of detecting an analyte in a sample, a computer program to carry out such a method, a mobile device and a kit. This method is based on processing differences in color or light intensity, where there is a need to obtain multiple images of at least one region of the strip where the test takes place. Furthermore, the reaction takes place exclusively on the test strip, thus limiting reaction schemes.

In the work of GARCIA, A. et al. (2011) "Mobile phone platform as portable chemical analyzer", Sensors and Actuators B: Chemical, v. 156, p 350-359, a mobile phone platform for portable chemical analysis is described, in which the platform is based on the use of a built-in camera to capture the image of a single-use colorimetric chemical sensor, while a software custom-built app processes this image to obtain its characteristic H (hue) value, which is related to the analyte concentration. However, the aforementioned article only deals with information regarding the use of color, the statistical treatment of color pixels, obtaining images in boxes that contain mobile device and strip. These strips are specific for carrying out reactions.

Therefore, in order to solve such problems a portable system based on digital image for the analysis of several parameters was developed, such as alkalinity (in addition to other cations and anions), an important parameter for predicting carbonate fouling. This analytical system can be applied for analysis in an onshore or offshore environment of fluids produced in the field.

From a set of analytical methodologies based on digital images acquired by portable devices and accessories developed in expeditious ways, it allows the performance of the analytical test without technical deepening by the executor of the analysis. Methodologies allow the evaluation, at least semi-quantitative, of chemical species relevant to the Oil & Gas (O&G) sector, for the following up of compositional parameters in aqueous samples and analytical monitoring of the effluent production and treatment. Thus, a quick implementation is possible considering eventual diagnoses associated with the parameters of interest and following up of different processes.

In addition, it is possible to establish more suitable fouling inhibition strategies enabling more proactive than reactive actions by the operation. Reactive transport models can be updated more frequently, making it possible to identify any anomalies or the presence of unmapped species. In this way, unscheduled production stops caused by fouling in the production system are avoided.

BRIEF DESCRIPTION OF THE INVENTION

The present invention refers to a portable digital image-based analysis system comprising a predictive model, software, neural networks, mobile device (cell phone), digital images, colorimetric method and reaction medium.

The application of the present invention can be in any laboratory present in an operational unit, whether offshore or onshore, for measuring different parameters, considering different aqueous dies (process water, effluents, etc). It can also be used for direct measurement in the field, depending on the necessary environmental and operating conditions.

BRIEF DESCRIPTION OF DRAWINGS

The present invention will be described in more detail below, with reference to the attached figures which, in a schematic and not limiting of the inventive scope, represent examples of its realization. In the drawings, there are.

DETAILED DESCRIPTION OF THE INVENTION

Figure 1:
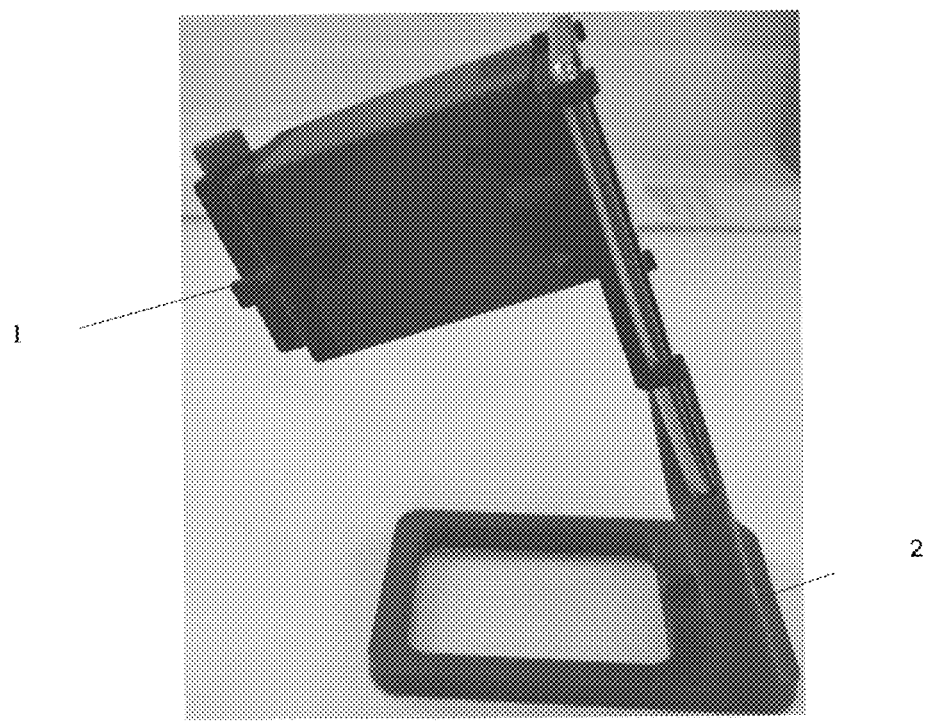
FIG. 1 illustrating the portable analysis system of the present invention, being (1) relative to the reading chamber and (2) the cell phone support.
Figure 2:
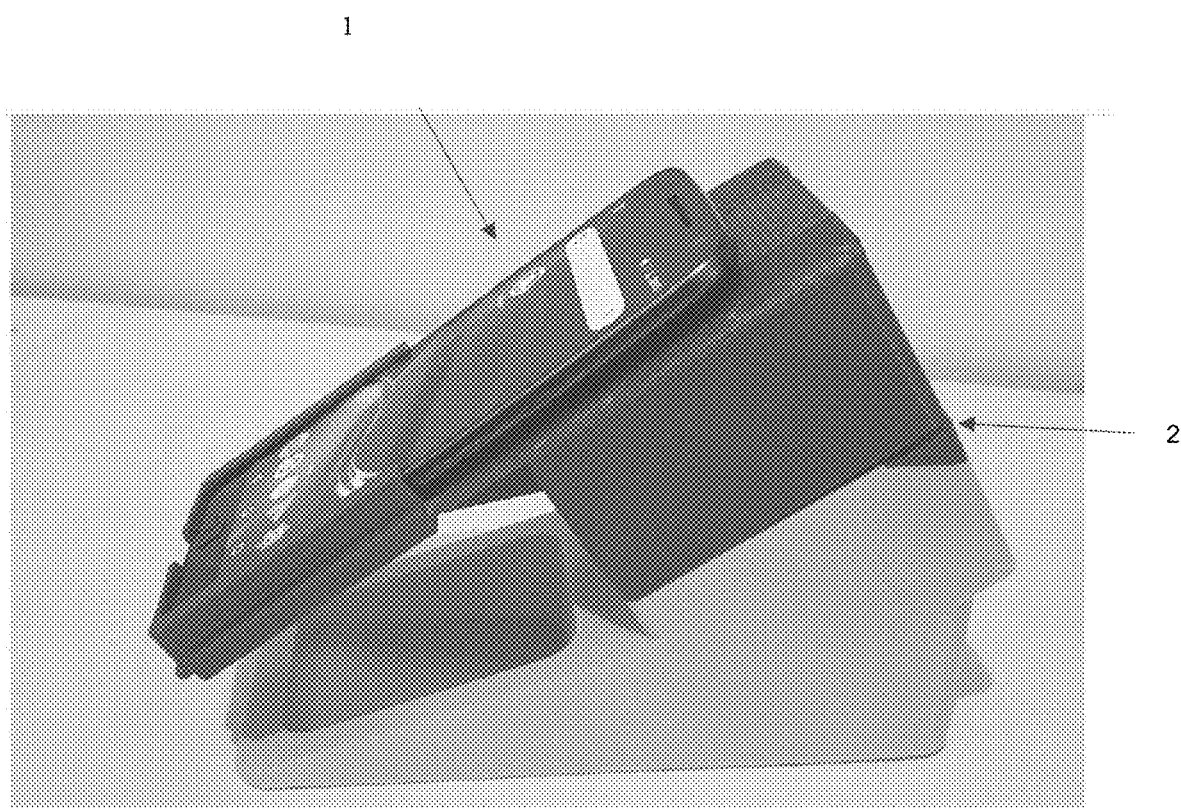
FIG. 2 illustrating the portable analysis system of the present invention, being (1) a cell phone used and (2) the support together with the reading camera.
Figure 3:
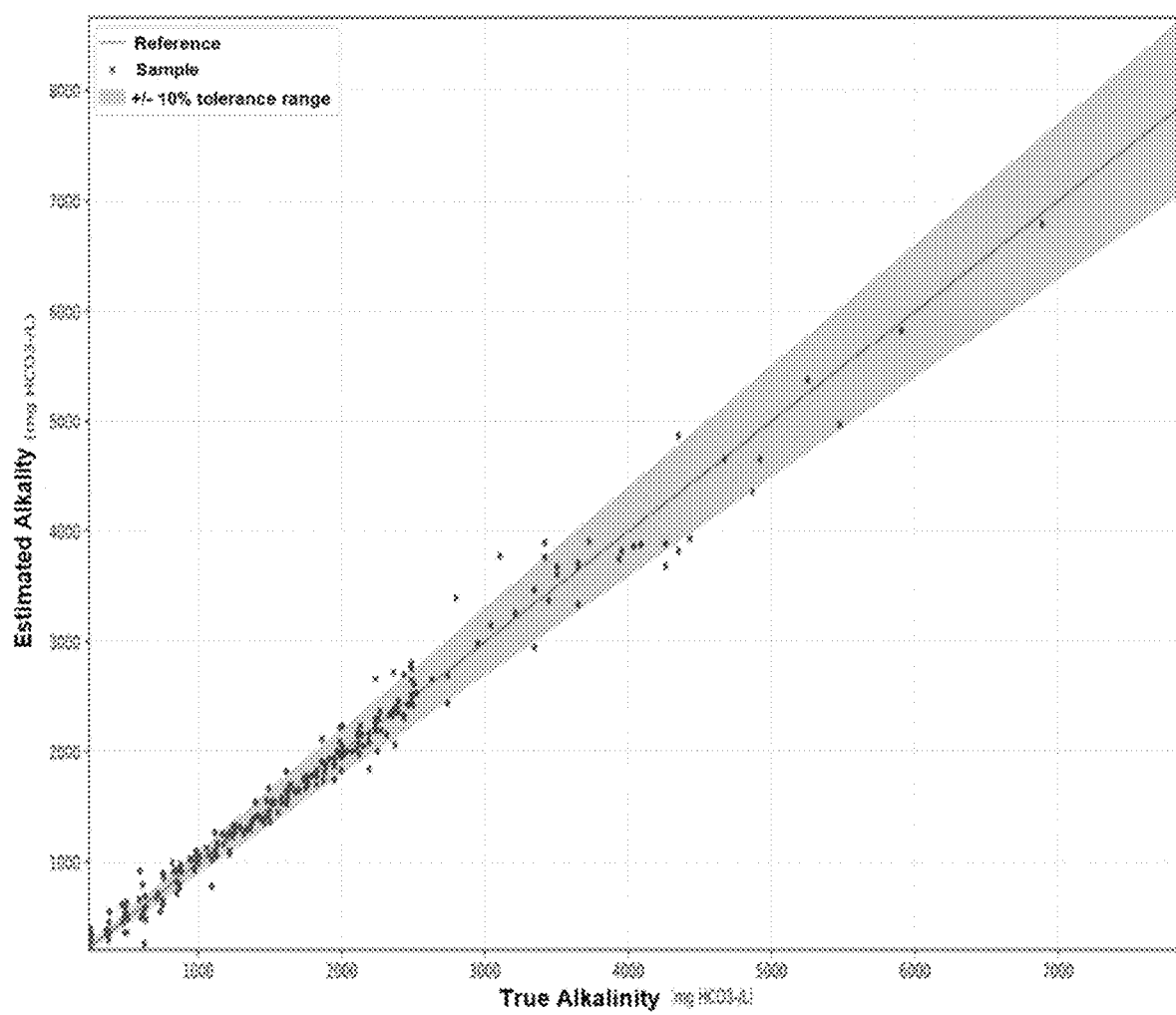
FIG. 3 illustrating a plot of measured alkalinity and estimated alkalinity for various reference samples.

The portable analysis system according to the present invention comprises a predictive model, software neural networks, mobile device (cell phone), digital images colorimetric method and reaction medium.

The present invention physically comprises two items of software (IS1 and IS2), an item of hardware (IH) and a reaction item (IR) Item IS1 consists of a regression algorithm set developed with computer vision and machine learning techniques to quantify/predict the concentration of various analytes.

Quantification is carried out based on the analysis with the IR and the processing of reaction images, taking as examples those originating from colorimetric and turbidimetric, captured by digital cameras. Regression algorithms are based on deep artificial neural networks which predictive models are fitted using supervised reverse propagation.

Item IS2 is a mobile app developed to instruct the user/analyst and assist him in capturing the digital images used in the adjustment of predictive models and in the application of adjusted models in the quantification of the aforementioned analytes.

Item of hardware (I H) consists of a three-dimensional geometric models set, called capture chambers, physically created by an additive manufacturing process (3D printing). The capture cameras are coupled to the mobile device in order to provide ideal conditions for capturing the digital images submitted to the predictive models.

The combination of these elements guarantees the invention portability, enabling its application in remote situations, obtaining analysis results without the need for equipments other than a cell phone.

Chemical reactions are carried out in the IR with specially formulated reagents. Reaction products are modified media that allow the distinction of images depending on the concentration of the analyte of interest, including preparation to eliminate any interference by other constituents of the samples.

EXAMPLES

The following examples are presented in order to more fully illustrate the nature of the present invention and the way to practice the same, without, however, being considered as limiting its content.

Tests were developed with the system of the present invention for the determination of alkalinity, phosphate, chloride and sulfate concentrations as described below.

Example 1: Determination of Alkalinity

To measure the alkalinity parameter, a test was carried out based on the sample interaction with a reagent solution (mixture of acid with indicator) and it is noted the formation of color in the sample (this inside an appropriate chamber to maximize the effect of artificial light incident and avoid contamination with ambient light).

From the analysis of the sample using the camera of a cell phone and the processing of this image obtained. Based on this information, the quantification of the target parameter is based on an initial calibration curve already processed.

Example 2: Determination of Phosphate Concentration

To measure the phosphate parameter, a test was performed based on the interaction of the sample with a reagent solution (in order to produce an effect of staining the sample) inside a suitable chamber to maximize the effect of the incident artificial light and avoid contamination with ambient light.

From the analysis of the sample using a cell phone camera and the processing of this image obtained, considering the color formation. Based on this information, the quantification of the target parameter is based on an initial calibration curve already processed.

Example 3: Determination of Chloride Concentration

To measure the chloride parameter, a test was performed based on the interaction of the sample with a reagent solution (which induces precipitation of the analyte) resulting in a cloudy medium. The analysis is carried out inside an appropriate chamber to maximize the effect of the incident artificial light and to avoid contamination with ambient light.

From the analysis of the sample using a cell phone camera and the processing of this image obtained, considering the formation of turbidity, shape and type of particle formed. Based on this information, the quantification of the target parameter is based on an initial calibration curve already processed.

Example 4: Determination of Sulfate Concentration

To measure the sulfate parameter, a test was performed based on the interaction of the sample with a reagent solution (which induces precipitation of the analyte) resulting in a turbid medium. The analysis is carried out inside an appropriate chamber to maximize the effect of the incident artificial light and to avoid contamination with ambient light.

From the analysis of the sample using a cell phone camera and the processing of this image obtained, considering the formation of turbidity. Based on this information, the quantification of the target parameter is based on an initial calibration curve already processed.

It should be noted that, although the present invention has been described with reference to the accompanying drawings, it may undergo modifications and adaptations by skilled in the art, depending on the specific situation, but as long as they are within the inventive scope defined herein.

The invention claimed is:

1. A portable analysis system comprising:
    a chamber configured to:
        hold a reaction mixture between a sample and a reagent solution inside the chamber; and
        receive artificial light and avoid contamination from ambient light; and
    a camera outside of the chamber and configured to capture digital images of the reaction mixture inside the chamber,
    wherein the system is configured to:
        analyze the digital images of the reaction mixture for a reaction mixture property, wherein the reaction mixture property comprises color, turbidity, or combinations thereof; and
        determine a sample property using the analysis of the digital images, wherein the sample property comprises alkalinity, analyte concentration, or combinations thereof.

2. The system according to claim 1, wherein analyzing the digital images of the reaction mixture comprises using regression algorithms developed with computer vision and machine learning techniques for determination of the sample property.

3. The system according to claim 2, wherein the regression algorithms are developed with deep artificial neural networks, wherein the deep artificial neural networks are trained by supervised reverse propagation.

4. The system according to claim 1, wherein the chamber is physically created by an additive manufacturing process.

5. The system according to claim 1, wherein analyzing the digital images of the reaction mixture comprises using predictive models trained from calibration data.

6. The system of claim 5, wherein the predictive models are adjusted using the captured digital images.

7. The system of claim 1, further comprising a mobile device comprising the camera.

8. The system according to claim 7, wherein the mobile device is configured to instruct the user and/or analyst and assist the user and/or analyst in capturing the digital images.

9. The system of claim 7, wherein the mobile device is a cell phone.

10. The system of claim 9, further comprising a cell phone support configured to support the cell phone in a position with respect to the chamber such that the camera of the cell phone is configured to capture digital images of the chemical reaction inside the chamber.

11. The system of claim 1, wherein the analyte concentration comprises phosphate concentration, chloride concentration, sulfate concentration, or combinations thereof.

* * * * *